United States Patent [19]
Li et al.

[11] Patent Number: 6,060,549
[45] Date of Patent: *May 9, 2000

[54] RUBBER TOUGHENED THERMOPLASTIC RESIN NANO COMPOSITES

[75] Inventors: Dongming Li, Fairport, N.Y.; Dennis George Peiffer, Annandale; Chester W. Elspass, Alpha, both of N.J.; Hsien-Chang Wang, Bellaire, Tex.

[73] Assignee: Exxon Chemical Patents, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,343

[22] Filed: May 20, 1997

[51] Int. Cl.$^7$ .................................................. C08K 3/00
[52] U.S. Cl. ........................................... 524/445; 524/578
[58] Field of Search ...................... 524/578, 445

[56] References Cited

U.S. PATENT DOCUMENTS

| | | | |
|---|---|---|---|
| 3,383,435 | 5/1968 | Cizek | 260/874 |
| 4,425,463 | 1/1984 | Walker et al. | 524/578 |
| 4,472,538 | 9/1984 | Kamigaito et al. | 523/202 |
| 4,810,734 | 3/1989 | Kawasumi et al. | 523/216 |
| 4,889,885 | 12/1989 | Usuki et al. | 524/445 |
| 5,162,445 | 11/1992 | Powers et al. | 525/333.4 |
| 5,514,734 | 5/1996 | Maxfield et al. | 523/204 |
| 5,552,469 | 9/1996 | Beall et al. | 524/445 |
| 5,578,672 | 11/1996 | Beall et al. | 524/446 |
| 5,631,316 | 5/1997 | Costemalle et al. | 524/578 |
| 5,698,640 | 12/1997 | Duvdevani et al. | 524/578 |

FOREIGN PATENT DOCUMENTS

| | | |
|---|---|---|
| 0 352 042 | 1/1990 | European Pat. Off. |
| 0 352042 A1 | 1/1990 | European Pat. Off. |
| 0 472 344 A2 | 2/1992 | European Pat. Off. |
| 0 559 278 A1 | 9/1993 | European Pat. Off. |
| 0 742 268 A2 | 11/1996 | European Pat. Off. |
| 0 747 322 A1 | 12/1996 | European Pat. Off. |
| WO 92/02582 | 2/1992 | WIPO |
| WO 93/11190 | 6/1993 | WIPO |
| WO 97/04029 | 2/1997 | WIPO |

OTHER PUBLICATIONS

Giannelis, Emmanuel P., "Polymer Layered Silicate Nanocomposites"—*Advanced Materials*, v.8(1)—Jan. 1, 1996—pp. 29–35.

*Kirk–Othmer Encyclopedia of Chemical Technology*, Third ed., vol. 18, pp. 406–435 (1982).

*Encyclopedia of Polymer Science and Technology*, v.10, pp. 392–414.

ASTM D 256–93A, "Standard Test Methods for Determining the Pendulum Impact Resistance of Notched Specimens of Plastics".

ASTM D 638–96, "Standard Test Method for Tensile Properties of Plastics".

*Primary Examiner*—Bernard Lipman
*Attorney, Agent, or Firm*—Myron B. Kurtzman; Brent M. Peebles; Joseph F. Reidy

[57] ABSTRACT

Toughened nanocomposite materials are prepared based on a blend of one or more thermoplastic engineering resins, e.g., nylon, a functionalized, e.g. brominated, copolymer of a $C_4$–$C_7$ isomonoolefin, e.g. isobutylene, and a para-alkylstyrene, e.g. para-methylstyrene, and further contain a uniformly dispersed exfoliated phyllosilicate layered clay, e.g., montmorillonite. The nanocomposite materials exhibit superior mechanical properties, including enhanced impact strength.

12 Claims, 7 Drawing Sheets

RUBBER TOUGHENED THERMOPLASTIC RESIN NANO COMPOSITES

BACKGROUND OF THE INVENTION

The invention relates to toughened thermoplastic resin compositions comprising layered mineral nanocomposites.

Description of Related Art

Thermoplastic resin compositions reinforced with exfoliated layered silicate materials have been described in the prior art. These compositions are generally prepared by treating a layered silicate material such as mica or montmorillonite clay with organic molecules which are capable of being sorbed between adjacent planar layers of the layered material, thereby expanding the space between adjacent layers from 4 Å or less to at least 10 Å or more. This process, known as intercalation, results in the development of intercalates which are more organophilic and which can be more readily exfoliated (dispersed) during admixture with a flowable thermoplastic resin to provide polymer nanocomposites having improved mechanical properties.

For example, WO93/11190 discloses polymer nanocomposites prepared by treating a layered phyllosilicate material with an organosilane, alone or combined with an onium salt, to produce an intercalate, followed by melt blending of the intercalate with a flowable polymer, such as a polyamide, under shear mixing conditions sufficient to allow the intercalate to exfoliate and become uniformly dispersed within the polymer matrix. Similarly, U.S. Pat. No. 4,472,538 discloses contact of a layered clay material with a polymerizable monomer e.g., epsilon-caprolactam which serves to swell and intercalate the clay, followed by contact of the intercalate with a catalyst which serves to polymerize the monomer, thereby forming a composite material composed of clay having organic high polymer intercalated between the clay layers. The resulting intercalated composite may then be extrusion blended with polyamide to form a nanocomposite composition.

Other references disclosing similar reinforced nanocomposite materials include U.S. Pat. Nos. 4,810,734, 4,889,885, 5,514,734, 5,552,469, 5,578,672 and EP 0747322 A-1.

Nanocomposite polymer compositions containing as little as 0.5 wt % of exfoliated layered silicate generally exhibit enhanced strength, e.g., tensile yield strength and flexural modulus, as compared with compositions which are free of the layered silicate or which contain conventional powdered fillers such as unexfoliated clay, silica or carbon black. In addition, the relatively flat platelet particles can be made to align such that the long dimension of the platelet is relatively parallel to the surfaces of molded or shaped articles prepared from such compositions, thereby imparting reduced permeability to the passage of gases or vapors in a direction normal to the long dimension of the platelet surface.

Where nanocomposites as described above are made using relatively stiff engineering polymers as the polymer matrix, i.e., polyamides, polyphenylene ethers, polyesters, polysulfones and the like, the presence of the exfoliated clay does not tend to enhance the already poor impact strength of the polymer, and may even tend to worsen the impact properties. It therefore is desirable to include an impact modifier in such compositions where the polymer composition is to be used in applications where high impact resistance is necessary, e.g. industrial parts such as automotive bumpers, consumer products, appliances and the like.

For example, EP A-0352042 discloses a composition comprising a polyamide resin, a layered silicate dispersed in the resin and an impact modifier comprising an acid modified polymer of an olefin or a block copolymer of styrene and a diolefin.

Similarly EPA-0472344 A-2 discloses reinforced thermoplastic compositions containing a clay-polyamide composite and further containing an elastomer treated with an alpha, beta unsaturated carboxylic acid or a derivative thereof as an impact modifier.

Although impact modifiers such as described above will provide an increase in the impact strength of reinforced nanocomposites with which they are formulated, they tend to have poor heat stability at temperatures required to melt process many engineering resins, e.g. >200° C., and thus may degrade during processing. In addition, impact modifiers containing unsaturated double bonds are susceptible to oxygen and/or ozone attack thereby diminishing the weathering properties of compositions in which they are incorporated.

SUMMARY OF THE INVENTION

The present invention provides rubber-toughened thermoplastic nanocomposite materials which exhibit not only superior tensile and modulus properties, but markedly improved impact strength. The compositions are thermoplastic nanocomposites comprising a blend of at least one thermoplastic engineering resin; an elastomeric functionalized copolymer of a $C_4$ to $C_7$ isomonoolefin containing up to about 20 mole % of the following aromatic monomer units randomly spaced along the polymer chain:

wherein R and $R^1$ are independently hydrogen, $C_1$ to $C_4$ alkyl or primary or secondary alkyl halides and X is a functional group selected from the group consisting of halogen; carboxy acids; carboxy salts; carboxy esters, amides and imides; hydroxy; alkoxide; phenoxide; thiolate; thioether; xanthate; cyanide; cyanate; amino and mixtures thereof; and c) an exfoliated phyllosilicate clay dispersed in said composition.

The elastomeric compolymer used in the composition not only enhances the impact strength of the composition but also is relatively thermostable at processing and molding temperatures of up to about 300° C. which may be necessary to properly formulate and/or thermoform the composition into shaped articles. The composition is also more resistant to oxidative degradation than similar compositions containing conventional elastomeric impact modifiers based on polymers containing unsaturated double bonds.

DETAILED DESCRIPTION OF THE INVENTION

The thermoplastic engineering resins suitable for practice of the present invention may be used singly or in combination and are resins containing nitrogen, oxygen, halogen, sulfur or other groups capable of interacting with an aromatic functional groups such as halogen or acidic groups. Suitable engineering resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyarnides are polycaprolactam (nylon 6), polylauryllactam (nylon 12), polyhexamethyleneadipamnide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon 11). Additional examples of satisfactory polyamides (especially those having a softening point below 275° C.) are described in Kirk-Othmer, Encyclopedia of Chemical Technology, v. 18, pp. 406–435 (1982) and Encyclopedia of Polymer Science and Technology, Vol. 10, pages 392–414. Commercially available thermoplastic polyamides may be advantageously used in the practice of this invention, with linear crystalline polyamides having a softening point or melting point between 160–230° C. being preferred.

Suitable thermoplastic polyesters which may be employed include the polymer reaction products of one or a mixture of alphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly (trans-1,4-cyclohexylene succinate) and poly (trans-1,4-cyclohexylene adipate); poly (cis or trans- 1,4-cyclohexanedimethylene) alkanedicarboxylates such as poly (cis 1,4-cyclohexane-di- methylene) oxlate and poly-(cis 1,4-cyclohexane-di- methylene) succinate, poly ($C_{2-4}$ alkylene terephthalates) such as polyethyleneterephthalate and polytetramethylene- terephthalate, poly ($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear, amorphous polymers having a glass transition temperature in the range of about 190° C. to 235° C.

Preferred PPE materials comprise the structure:

wherein Q is a monovalent substituent group selected from halogen, hydrocarbon having less than 8 carbon atoms, hydrocarbonoxy and halohydrocarbonoxy. More preferably, Q is the same or different alkyl group having from 1 to 4 carbon atoms and n is a whole integer of at least 100, preferably from 150 to about 1200. Examples of preferred polymers are poly (2,6-dialky-1,4 phenylene ethers) such as poly (2,6 dimethyl-1,4-phenylenether), poly 2-methyl-6-ethyl-1, 4 phenylene ether), poly-(2,6-dipropyl-1,4-phenylene ether) and poly (2-ethyl-6-propyl-1,4-phenylene ether). These polymers, their method of preparation and blends with polystyrene are further described in U.S. Pat. No. 3,383,435, the complete disclosure of which is incorporated herein by reference.

Other thermoplastic resins which may be used include the polycarbonate analogs of the polyesters described above such as segmented poly (ether co-phthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenyl sulfone; and like engineering resins as are known in the art.

The $C_4$–$C_7$ isomonoolefin copolymers used in the invention are random elastomeric copolymers of a $C_4$ to $C_7$ isomonoolefin, such as isobutylene and a para-alkylstryene comonomer, preferably para-methylstryene containing at least about 80%, more preferably at least about 90% by weight of the para-isomer and also include functionalized interpolymers wherein at least some of the alkyl substituent groups present in the styrene monomer units contain benzylic halogen or some other functional group. Preferred materials may be characterized as isobutylene interpolymers containing the following monomer units randomly spaced along the polymer chain:

1.

2.

wherein R and R' are independently hydrogen, lower alkyl, preferably $C_1$ to $C_7$ alkyl and primary or secondary alkyl halides and X is a functional group such as halogen. Preferably R and R' are each hydrogen. Up to about 60 mole % of the para-substututed styrene present in the interpolymer structure may be the functionalized structure (2) above.

The functional group X may be halogen or some other functional group which may be incorporated by nucleophilic substitution of benzylic halogen with other groups such as carboxy acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers and their method of preparation are more particularly disclosed in U.S. Pat. No. 5,162,445, the complete disclosure of which is incorporated herein by reference.

Most useful of such functionalized materials are elastomeric random interpolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom, as well as acid functionalized versions thereof wherein the halogen atom has been displaced by maleic anhydride or by acrylic or methacrylic acid functionality.

In the preferred embodiment, the functionality is selected such that it can react or form polar bonds with functional groups present in the matrix polymer, e.g., acid, amino or hydroxyl functional groups, when the polymer components are mixed at high temperatures.

These functionalized polymers have a substantially homogeneous compositional distribution such that at least 95% by weight of the polymer has a para-alkylstyrene content within 10% of the average para-alkylstyrene content of the polymer. More preferred polymers are also characterized by a narrow molecular weight distribution (Mw/Mn) of less than about 5, more preferably less than about 2.5, a preferred viscosity average molecular weight in the range of from about 200,000 up to about 2,000,000 and a preferred number average molecular weight in the range of from about 25,000 to about 750,000 as determined by gel permeation chromatography.

The copolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred copolymers are brominated polymers which generally contain from about 0.1 to about 5% mole of bromomethyl groups. More preferred copolymers contain from about 0.05 up to about 2.5 wt % of bromine, based on the weight of the polymer, more preferably from about 0.05 to 0.75 wt % bromine and are substantially free of ring halogen or halogen in the polymer backbone chain.

These copolymers, their method of preparation, their method of cure and functionalized polymers derived therefrom are more particularly disclosed in the above referenced U.S. Pat. No. 5,162,445.

The elastomeric functionalized copolymer is incorporated into the composition at a level sufficient to enhance the impact properties of the composition, i.e., generally at a level of from about 0.5 to less than 50 wt %, more preferably 5 to 35 wt % and most preferably at a level of 10 to 30 wt %, based on the total polymer content of the composition.

Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platlets having a thickness of about 8–12 Å tightly bound together at interlayer spacings of 4 Å or less, and contain exhangeable cations such as $Na^+$, $Ca^{+2}$, $K^+$ or $Mg^{+2}$ present at the interlayer surfaces.

They layered clay may be intercalated by treatment with organic molecules (swelling agents) capable of undergoing ion exchange reactions with the cations present at the interlayer surfaces of the layered silicate. Suitable swelling agents include cationic surfactants such as ammonium (primary, secondary, tertiary and quaternary), phosphonium or sulfonium derivatives of aliphatic, aromatic or arylaliphatic amines, phosphines and sulfides.

Another class of swelling agents include those which can be covalently bonded to the interlayer surfaces. These include polysilanes of the structure $—Si(R')R^2R^2$ where R' is the same or different at each occurrence and is selected from alky, alkoxy or oxysilane and $R^2$ is an organic radical compatible with the matrix polymer of the composite.

Other suitable swelling agents include protonated amino acids and salts thereof containing 2–30 carbon atoms such as 12-aminododecanoic acid, epsilon-caprolactam and like materials.

Suitable swelling agents and processes for intercalating layered silicates are disclosed in U.S. Pat. Nos. 4,472,538, 4,810,734, 4,889,885 as well as WO92/02582, the complete disclosures of which are incorporated herein by reference.

Treatment with the swelling agents described above results in intercalation of the layered platlets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of exfoliated layered clay incorporated in the nanocomposites in accordance with this invention is sufficient to develop an improvement in the mechanical properties of the nanocomposite, e.g. flexural modulus and tensile strength. Preferred amounts generally will range from about 0.5 to 10 wt %, more preferably from about 1 to 5 wt %, based on the polymer content of the nanocomposite.

Upon subjecting a flowable mixture of the swellable intercalated layered material and a polymer melt to shear mixing, at least about 80% by weight, preferably at least about 85% by weight, more preferably at least about 90% by weight and most preferably at least about 95 % by weight of the layers of the material delaminate to form exfoliated platelet particles substantially homogeneously dispersed in the polymer matrix. As used herein, "platelet particles" are particles having two relatively flat opposite faces, the thickness of which platelets is the distance between the faces, which is relatively small compared to the size of the faces. As formed by this process, the platelet particles dispersed in matrix polymers have the thickness of the individual layers or small multiples less than about 10, preferably less than about 5 and more preferably less than about 3 of the layers, and still more preferably 1 or 2 layers. Preferably, intercalation of every interlayer space is complete so that all or substantially all individual layers delaminate one from the other to form separate platelet particles.

The other dimensions of the exfoliated platelet particles may vary greatly. The particle faces are roughly hexagonal or rectangular having average diameters between about 50 Å and about 10,000 Å with a maximum diameter of about 20,000 Å, such that the aspect ratio (i.e., length/thickness) ranges from about 2000 to about 10 and an average thickness of less than about 50 Å with a maximum thickness of 100 Å. For the purposes of the present invention, the average diameter is defined as the diameter of a circle having an area equal to the surface area of one broad surface face of the platelet shaped particle. In the preferred embodiments of the invention the average thickness of the platelet particles is equal to or less than about 20 Å with a maximum diameter of about 10,000 Å and the average diameter between 100 Å and 5,000 Å. Most preferably the average thickness is about from 5 to 15 Å and the average diameter is from about 150 to about 2500 Å.

The average spacing between the exfoliated platelet particles within the polymer matrix will vary as a function of the concentration of the platelets in the polymer matrix. In general, interplatlet spacing will be greater than about 25 Å, more usually greater than 50 Å.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto- 5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated allyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the components may be carried out by combining the polymer components and the clay in the form of an intercalate in any suitable mixing device such as a Banbury mixer, Brabender mixer or preferably a mixer/extruder and mixing at temperatures in the range of about 180° C. up to about 300° C. under conditions of shear sufficient to disperse the elastomer in the engineering polymer matrix and to allow the clay intercalate to exfoliate and become uniformly dispersed within the polymer matrix to form the nanocomposite. Alternatively, the clay may be separately combined with the engineering resin and exfoliated within this resin matrix by melt mixing, followed by extrusion and pelletization of the resin composition. These pellets may then be mixed with pellets comprising the functionalized elastomeric copolymer, melt mixed as described above and pelletized. If the mixture is to be dynamically vulcanized, after the resin and the elastomeric copolymer have been intimately mixed, the curative or curatives are added. Heating and masticating at vulcanization temperatures of 180° C. to 300° C. are generally adequate to complete vulcanization in about 0.5 to about 10 minutes.

A more complete description of the preparation of dynamically vulcanized compositions is found in WO 92/02582, the disclosure of which is incorporated herein by reference.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability.

The following examples are illustrative of the invention.
Materials used in the following examples are as follows:
NYLON-6—Polycaprolactam available from UBE Industries, Inc. of Japan under the designation 1022 B.
NYLON-6M—Nylon 6 containing 2 wt % of exfoliated montmorillonite clay (UBE 1022C-2)
NYLON-6/66—80/20 wt % copolymer of epsilon-caprolactam and polyhexamethylene adipamide available from UBE Industries, Inc. of Japan under the designation 5034B.
NYLON 6/66 M—Nylon 6/66 containing 2 wt % of exfoliated montmorillonite clay (UBE-5034 C-2).
BR-IPMS—A brominated elastomeric copolymer of isobutylene and para-methylstyrene having a viscosity average molecular weight of 350,000 g/mole (20° C. in diisobutylene), Mooney Viscosity of 35 (ML 1+8@125° C.), and containing 1.2 wt % benzylic bromide as determined by x-ray fluorescence. Available form Exxon Chemical Co. under the trade designation EXXPRO™ 93-5.

EXAMPLES 1–12

A series of formulations were prepared by compounding polyamide resin and brominated isobutylene/para-methylstyrene elastomer present at various levels as shown in Table 1 (wt %). The formulations of Examples 4–6 and 10–12 are based on polyamide which contains 2 wt % of exfoliated montmorillonite clay; the formulations of Examples 1–3 and 7–9 are controls which do not contain clay.

Compounding Processes and Machining of Test Specimens

All experimental samples were compounded by using a 0.8 inch Welding Engineers counterrotating twin screw extruder fitted with a strand die, a cooling water bath, and a pelletizer. A stream of nitrogen was introduced to provide an inert atmosphere and to purge reaction by-products. This was followed by a downstream vent zone to further collect any reaction by-products.

Polyamide pellets were dried in a dehumidifier oven at 60° C. for four hours before compounding. BR-IPMS elastomer was first granulated into pellets (Pulman grinder) approximately 5 mm in diameter. A small amount of Irganox 1010 powder (antioxidant produced by Ciba Gigy Corp.) was introduced as an anti-sticking agent during granulation to prevent agglomeration. The excess antioxidant was removed through discharging into a cyclone. Polyamide and BR-IPMS granules were dry-blended at various weight ratios and then metered into the feed throat of the extruder using a K-Tron screw feeder. The extruder operated at 400 RPM and in the temperature range of 200–230° C. for nylon 6/66 and 220–250° C. for nylon 6. The finished pellets were dried for four hours at 70° C. using the same dehumidifier dryer before being converted into test specimens with a model 15/5 boy injection molding machine.

Mechanical Testing

The test specimens produced above were stored in metal cans before they were tested to obtain dry-as-molded data. Notched Izod impact tests were conducted according to ASTM D256 in a temperature range of −40° C. to 25 ° C. The instrument used was an ICI instrumented impact tester with a custom-made temperature chamber. The average values from at least five tests are reported. The geometry of a standard Izod impact test specimen is: length L=70 mm, width W=12.54 mm, thickness B=3.18 mm, notch depth =2.54 mm, and radius of notch base R=0.25 mm. The specimens were directly tested in the temperature chamber. Temperature equilibrium was assumed by monitoring the temperature of a dummy specimen in the chamber with a thermocouple.

Uniaxial tensile tests were conducted with an Instron Model 4502 machine at a crosshead speed of 50 mm/min. at room temperature. ASTM D638 type I dumbbell shaped specimens were used. The geometry of such a specimen is: gauge length $L_0$=55 mm, overall length L=165 mm, gauge width $W_0$=12.54 mm, overall width W=19mm, and thickness B=3.75 mm.

TABLE 1

| EXAMPLE | NYLON 6 | NYLON 6M* | NYLON 6/66 | NYLON 6/66M* | BR-IPMS |
|---|---|---|---|---|---|
| 1 | 90 | | | | 10 |
| 2 | 80 | | | | 20 |
| 3 | 70 | | | | 30 |
| 4 | | 90 | | | 10 |
| 5 | | 80 | | | 20 |
| 6 | | 70 | | | 30 |
| 7 | | | 90 | | 10 |
| 8 | | | 80 | | 20 |
| 9 | | | 70 | | 30 |
| 10 | | | | 90 | 10 |
| 11 | | | | 80 | 20 |
| 12 | | | | 70 | 30 |

*This polyamide contains 2 wt % Talc (Montmorillonite)

Table 2 displays the Izod impact measurements at three temperatures, (18° C., 0° C., and 20° C.), flexural modulus (FM, yield stress (Yld str.) maximum stress (max str.), and maximum strain (max stn.) for the polyamide (PA) matrices, polyamide-clay nanocomposites as well as rubber-toughened polyamide-clay nanocomposites.

TABLE 2

| FORMULATION | PA | BR-IPMS | ft-lb/in NI @ 20° C. | ft-lb/in NI @ 20° C. | ft-lb/in NI @- 20° C. | kpsi FM | kpsi Yld Str | kpsi Max Str | % Max Stn |
|---|---|---|---|---|---|---|---|---|---|
| Cont. | 100 | 0 | 0.8 | 0.5 | 0.4 | 356 | 8.7 | >10 | >300 |
| Ex. 1 | 90 | 10 | 4.0 | 1.5 | 1.3 | 298 | 7.0 | 7.6 | 209.5 |
| Ex. 2 | 80 | 20 | 20.2 | 3.0 | 2.5 | 242 | 6.1 | 6.9 | 246.8 |

TABLE 2-continued

| FORMULATION | PA | BR-IPMS | ft-lb/in NI @ 20° C. | ft-lb/in NI @ 20° C. | ft-lb/in NI @-20° C. | kpsi FM | kpsi Yld Str | kpsi Max Str | % Max Stn |
|---|---|---|---|---|---|---|---|---|---|
| Ex. 3 | 70 | 30 | 22.0 | 15.3 | 2.4 | 188 | 4.7 | 4.9 | 137.7 |
| Cont. | 100 | 0 | 0.4 | 0.3 | 0.4 | 500 | 11.5 | 11.5 | 189.0 |
| Ex. 4 | 90 | 10 | 2.4 | 1.5 | 1.7 | 380 | 8.4 | 8.4 | 150.8 |
| Ex. 5 | 80 | 20 | 17.6 | 2.0 | 1.4 | 285 | 6.1 | 6.6 | 228.7 |
| Ex. 6 | 70 | 30 | 23.5 | 6.0 | 3.0 | 197 | 5.0 | 5.0 | 148.6 |
| Cont. | 100 | 0 | 0.8 | 0.4 | 0.3 | 292 | 7.5 | 8.0 | 241.3 |
| Ex. 7 | 90 | 10 | 15.3 | 1.1 | 0.7 | 240 | 5.8 | 8.9 | 311.5 |
| Ex. 8 | 80 | 20 | 21.9 | 3.0 | 2.4 | 191 | 4.7 | 7.4 | 283.6 |
| Ex. 9 | 70 | 30 | 24.8 | 18.7 | 3.1 | 156 | 4.1 | 6.7 | 290.3 |
| Cont. | 100 | 0 | 0.5 | 0.3 | 0.2 | 317 | 8.6 | 10.3 | 314.5 |
| Ex. 10 | 90 | 10 | 3.2 | 0.4 | 0.5 | 286 | 5.8 | 8.7 | 283.0 |
| Ex. 11 | 80 | 20 | 20.2 | 1.6 | 1.3 | 203 | 4.9 | 7.4 | 289.2 |
| Ex. 12 | 70 | 30 | 23.6 | 5.2 | 2.5 | 167 | 4.1 | 5.9 | 239.1 |

In FIGS. 1–7, the property data is plotted for each test sample and compared with the controls which are devoid of BR-IPMS impact modifier.

Figure 1:
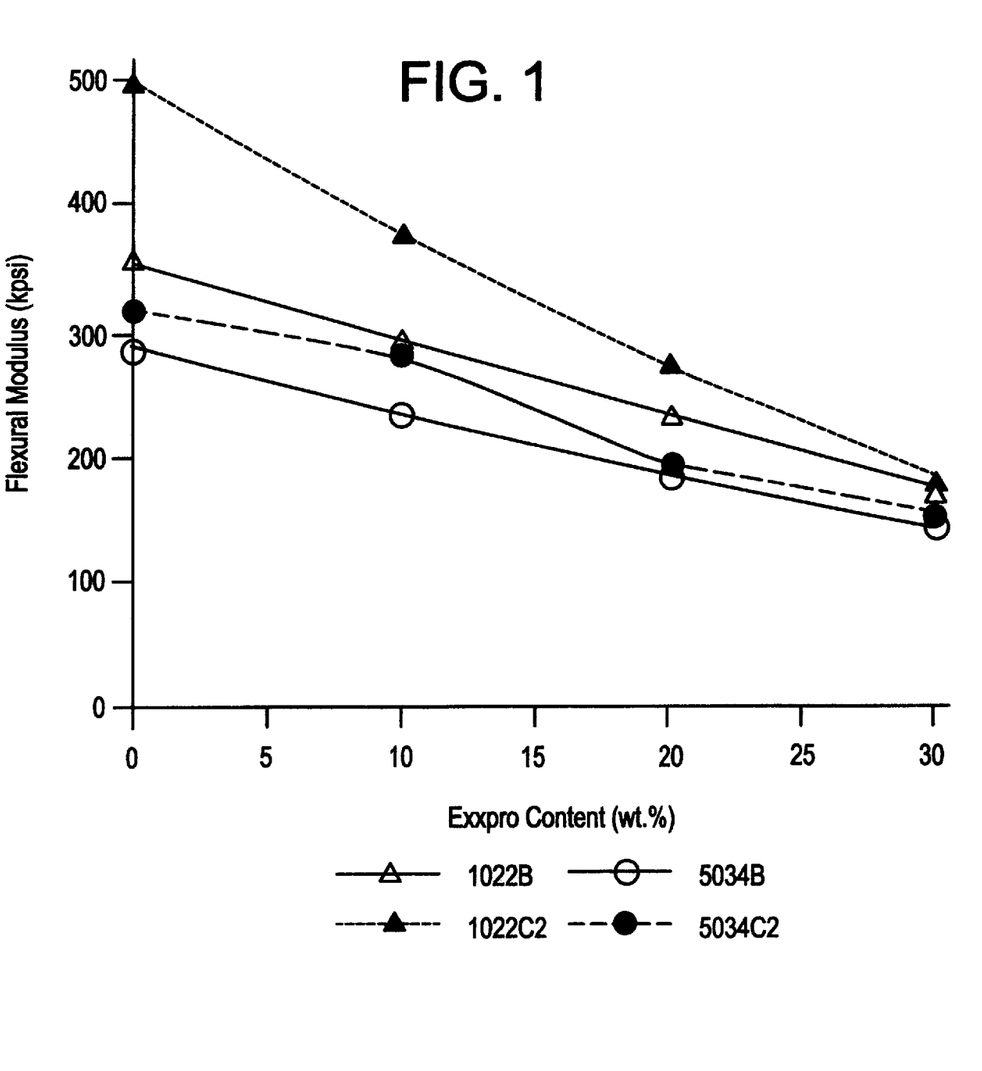
FIG. 1 is a graph showing the interrelationship between flexural modulus and elastomeric copolymer content of the composition.

FIG. 1 shows the interrelationship between the flexural modulus and BR-IPMS content of the polyamide and polyamide-clay nanocomposites. The data shows that the modulus is decreased with the blending of increasing levels of elastomer. However, the magnitude of the reduction in modulus is substantially less, i.e. retained with the addition of only 2 wt % clay. The magnitude of the flexural modulus is directly dependent on the concentration of clay in the rubber-toughened blend.

Figure 2:
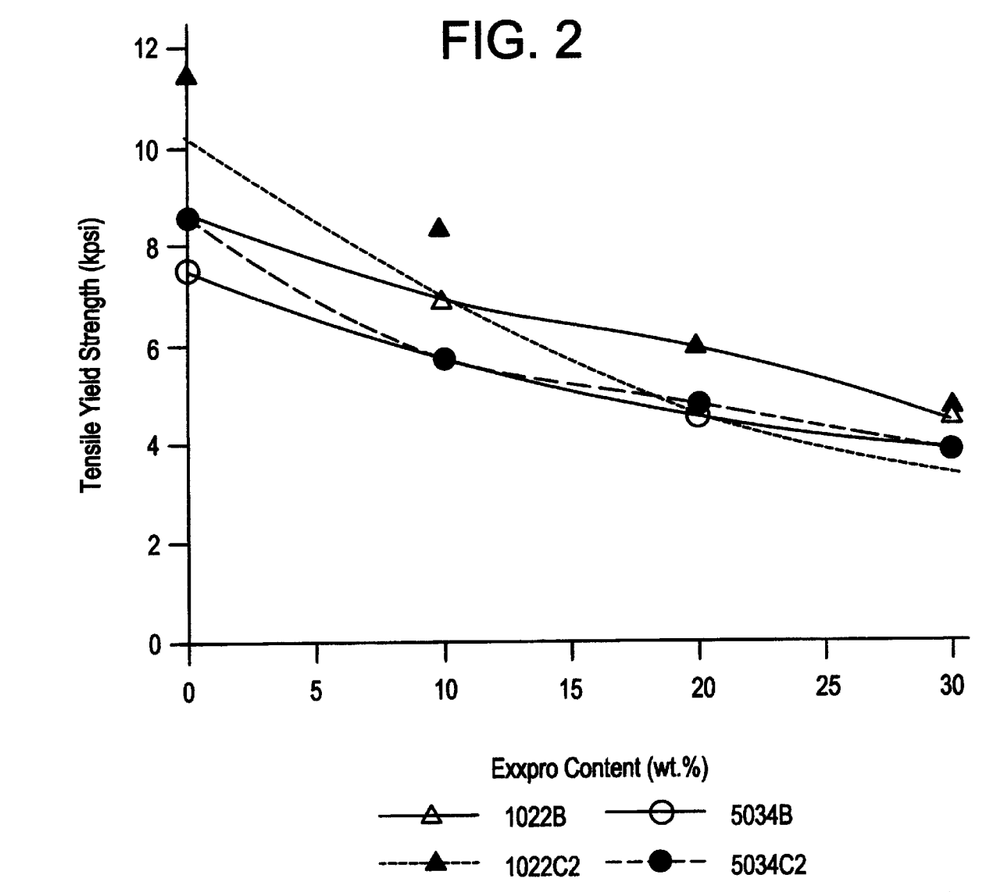
FIG. 2 is a graph showing tensile yield strength as a function of elastomeric copolymer content of the composition.

The tensile yield strength as a function of BR-IPMS content is presented in FIG. 2. The tensile yield strength decreases with increasing elastomer content, but the magnitude of the decrease is dependent on the presence of the clay.

Figure 3:
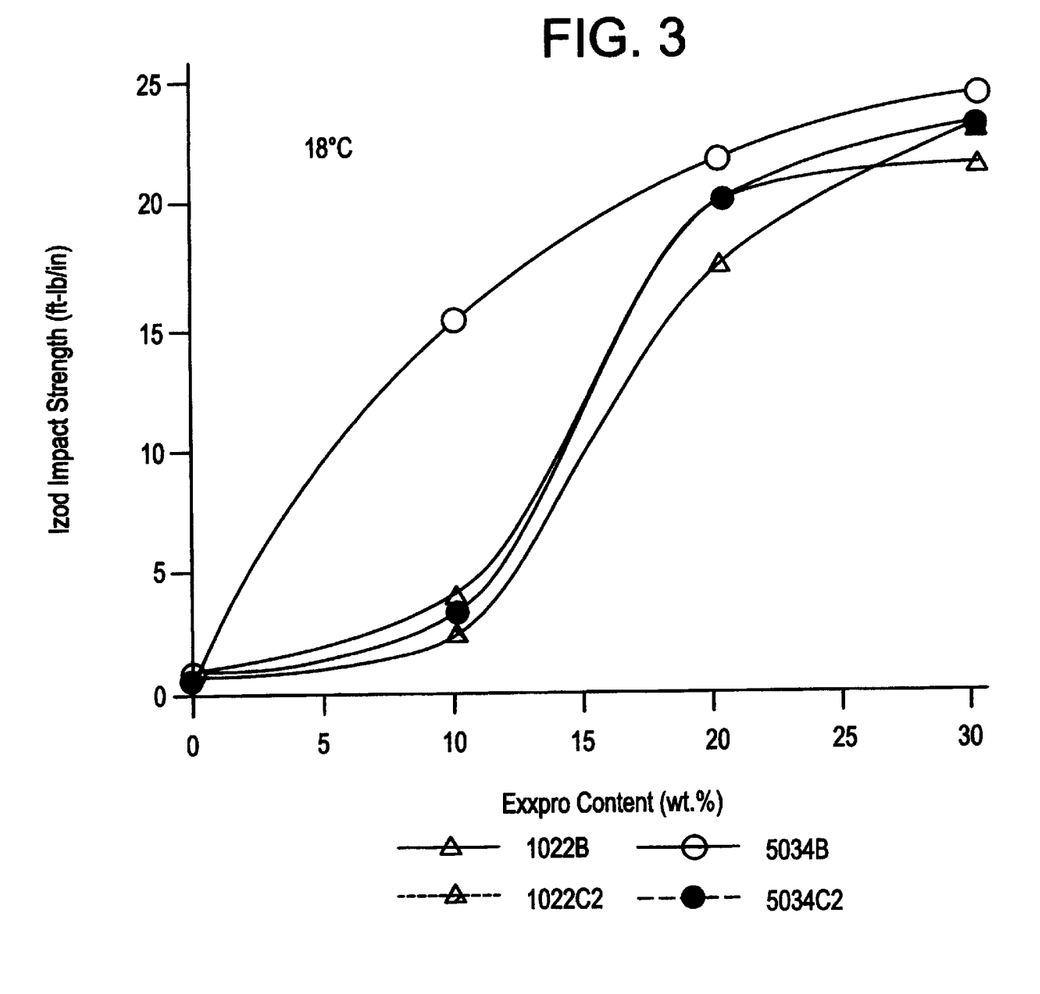
FIG. 3 is a graph depicting Izod impact strength as a function of elastomeric copolymer content of the composition.

FIG. 3 shows the Izod impact strength as a function of elastomer content. The measurement temperature was 18° C. With the addition of BR-IPMS, the Izod impact strength is found to be markedly enhanced overall. At elastomer levels approaching 15 wt % and above, the impact strength of the rubber-toughened nylon 6/66 clay nanocomposite begins to rapidly approach the values of the rubber-toughened polyamide. The Izod impact strength of the rubber-toughened nylon 6-clay nanocomposite follows closely the values for the rubber-toughened nylon 6 blend. In essence, these nanocomposite compositions have high impact strength as well as high stiffness, i.e. modulus and high tensile properties.

Figure 4:
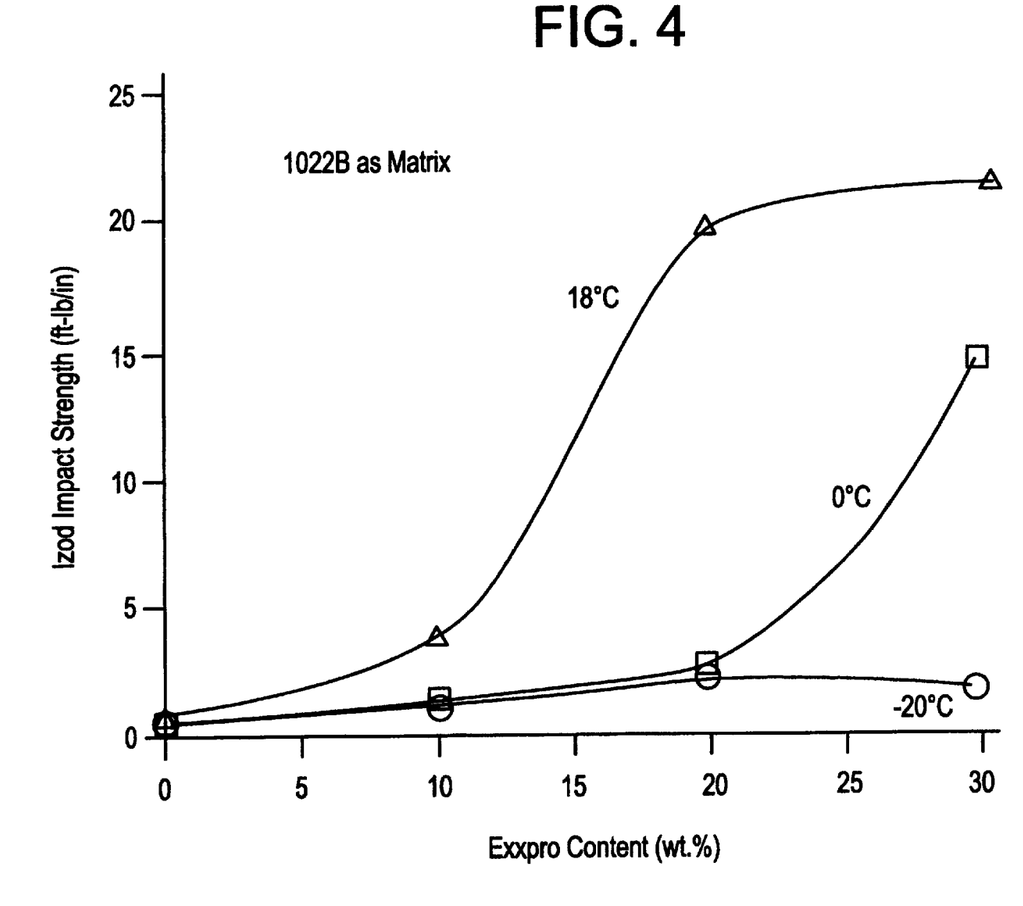
FIGS. 4 and 6 are graphs showing Izod impact strength of polyamide compositions which are devoid of exfoliated clay.
Figure 5:
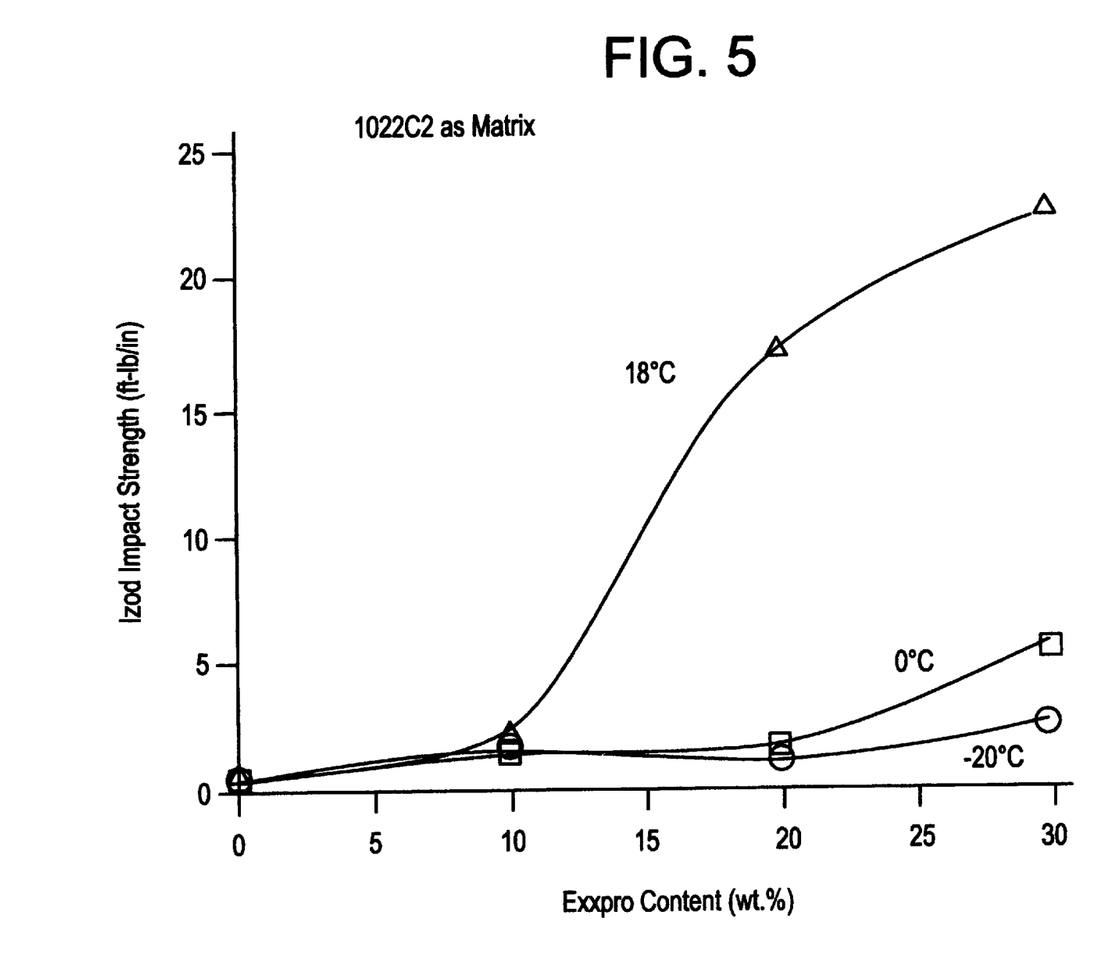
FIGS. 5 and 7 are graphs showing Izod impact strength of a polyamide compositions which contain exfoliated clay in accordance with this invention.

The Izod impact measurements as a function of BR-IPMS content and measurement temperature is shown in FIGS. 4 and 5. FIG. 4 shows the data for the nylon 6 homopolymer, while FIG. 5 shows the data for the corresponding clay nanocomposite formulation. The data shows the impact strength of the clay nanocomposite is essentially retained with the addition of the elastomer over a broad temperature range. A "supertough" polyamide possessing improved tensile flexural properties is produced.

Figure 6:
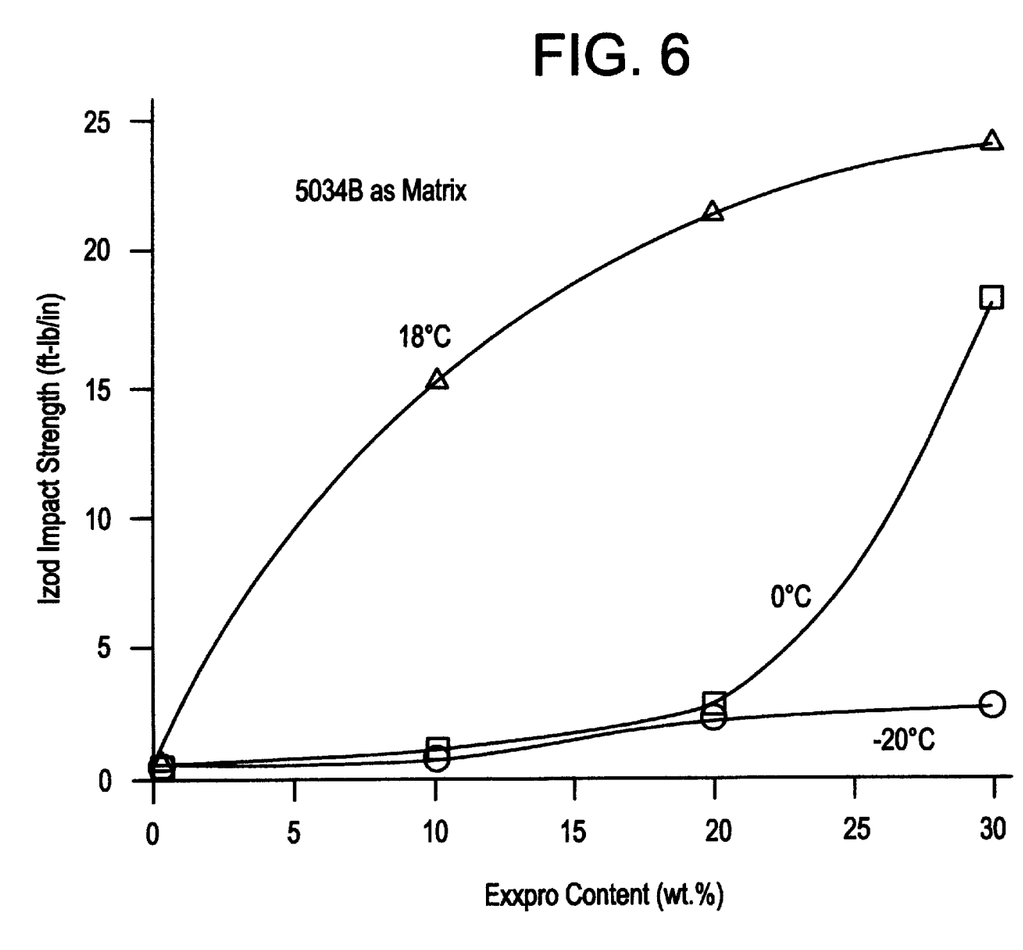
Figure 7:
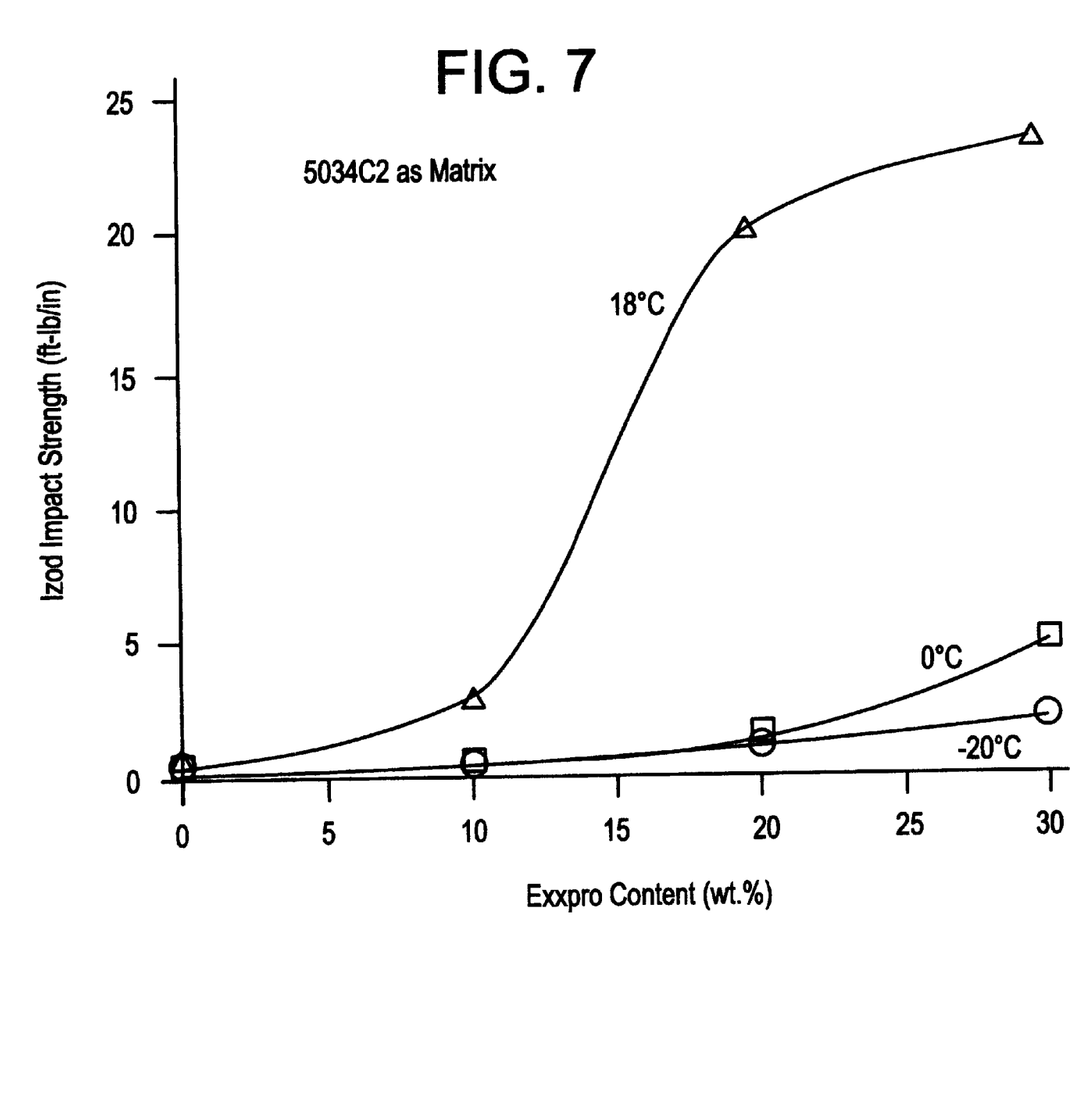

FIGS. 6 and 7 show the Izod impact strength of nylon 6/66 clay nanocomposites as well as the parent matrix polymer as a function of elastomer content and measurement temperature. A comparison of the rubber-toughened clay nanocomposite data and its rubber-toughened nylon 6/66 counterpart shows comparable properties above a specific concentration of elastomer. Even below this concentration, improved impact properties are observed. The magnitude of the impact strength in these materials are directly related to the parameters described in FIG. 3.

We claim:

1. A thermoplastic polymer nanocomposite composition comprising a blend of:
   a) at least one thermoplastic engineering resin;
   b) an elastomeric functionalized copolymer of a $C_4$ to $C_7$ isomonoolefin containing up to about 20 mole % of the following aromatic monomer units randomly spaced along the polymer chain:
      wherein R and $R^1$ are independently hydrogen, $C_1$ to $C_4$ alkyl or primary or secondary alkyl halides and X is a functional group selected from the group consisting of halogen; carboxy acids; carboxy salts; carboxy esters, amides and imides; hydroxy; alkoxide; phenoxide; thiolate; thioether; xanthate; cyanide; cyanate; amino and mixtures thereof, and
   c) an exfoliated phyllosilicate clay, having cationic surfactants, dispersed in said composition, wherein said clay is present in said composition at a level of from about 0.5 to 10 wt %, based on the polymer content of said blend.

2. The composition of claim 1 where said engineering resin is selected from the group consisting of polyamides, polyimides, polyesters, polycarbonates, polysulfones, polylactones, polyacetals, acrylonitrile/butadiene/styrene copolymer resins, polyphenylene oxides, polyphenylene sulfides, polystyrene, styrene/acrylonitrile copolymer resins, styrene/maleic anhydride copolymer resins, aromatic polyketones and mixtures thereof.

3. The composition of claim 2 wherein said engineering resin is a polyamide.

4. The composition of claim 1 wherein X is bromine or chlorine.

5. The composition of claim 4 wherein R and R' are hydrogen and said $C_4$ to $C_7$ isomonoolefin is isobutylene.

6. The composition of claim 5 wherein X is bromine.

7. The composition of claim 1 wherein said exfoliated phyllosilicate clay is a smectic clay selected from the group consisting of montmorillonite, nontronite, beidellite, volkonskoite, laponite, hectorite, saponite, sauconite, magadite, kenyaite, stevensite, vermiculite and mixtures thereof.

8. The composition of claim 7 wherein said exfoliated clay is montomorillonite.

9. The composition of claim 1 wherein said elastomeric functionalized copolymer is present in said composition at a level of from about 1 to less than 50 wt % based on the polymer content of said blend.

10. The composition of claim 9 wherein said elastomeric functionalized copolymer is present in said composition at a level of from about 5 to 35 wt %, based on the polymer content of said blend.

11. The composition of claim 1 wherein said elastomeric copolymer is a brominated copolymer of isobutylene containing from about 0.5 up to 20 mole % of para-methylstyrene.

12. A thermoplastic polymer nanocomposite composition comprising a blend of:
   a) at least one polyamide;
   b) an elastomeric functionalized copolymer of a $C_4$ to $C_7$ isomonoolefin containing up to about 20 mole % of the following aromatic monomer units randomly spaced along the polymer chain:
      wherein R and $R^1$ are independently hydrogen, $C_1$ to $C_4$ alkyl or primary or secondary alkyl halides and X is a functional group selected from the group consisting of halogen; carboxy acids; carboxy salts; carboxy esters, amides and imides; hydroxy; alkoxide; phenoxide; thiolate; thioether; xanthate; cyanide; cyanate; amino and mixtures thereof; and
   c) one or more layers of an exfoliated phyllosilicate clay, having cationic surfactants, dispersed in said composition, the layers spaced at distances greater than 4 Å and intercalated with one or more swelling agents; wherein said clay is present in said composition at a level of from about 0.5 to 10 wt %, based on the polymer content of said blend.

* * * * *